United States Patent

[11] 3,555,994

| [72] | Inventors | Joseph S. Nemetz<br>8738-1/2 Artesia Blvd., Bellflower, Calif. 90706<br>Leland E. Bewick, 10928 S. Woodruff Ave., Downey, Calif. 90241 |
|---|---|---|
| [21] | Appl. No. | 763,724 |
| [22] | Filed | Sept. 30, 1968 |
| [45] | Patented | Jan. 19, 1971 |

[54] DISPOSABLE GRILL COVER
6 Claims, 5 Drawing Figs.

[52] U.S. Cl. .................................................. 99/444, 126/25
[51] Int. Cl. ...................................................... A47j 37/07
[50] Field of Search .......................................... 99/444, 445, 446, 375, 400, 408, 425; 126/9, 25, 29, 51, 383; 126/25

[56] References Cited
UNITED STATES PATENTS

| 2,772,627 | 12/1956 | Newell ........................ | 99/425 |
| 2,908,214 | 10/1959 | Persinger ..................... | 99/445 |
| 3,082,757 | 3/1963 | Hohe ............................ | 99/445X |
| 3,211,082 | 10/1965 | Sachnoff et al. .............. | 99/444 |

Primary Examiner—William I. Price
Assistant Examiner—Arthur O. Henderson
Attorney—J. Carroll Baisch ABSTRACT: A disposable drippings-shedding cover for the grill of a barbecue, formed to fit over and removably connect with the food-supporting wires thereof and so conforming to said wires as to provide for ample broiling heat for items of food disposed thereupon while also keeping drippings from said food reaching most of the wires of the grill.

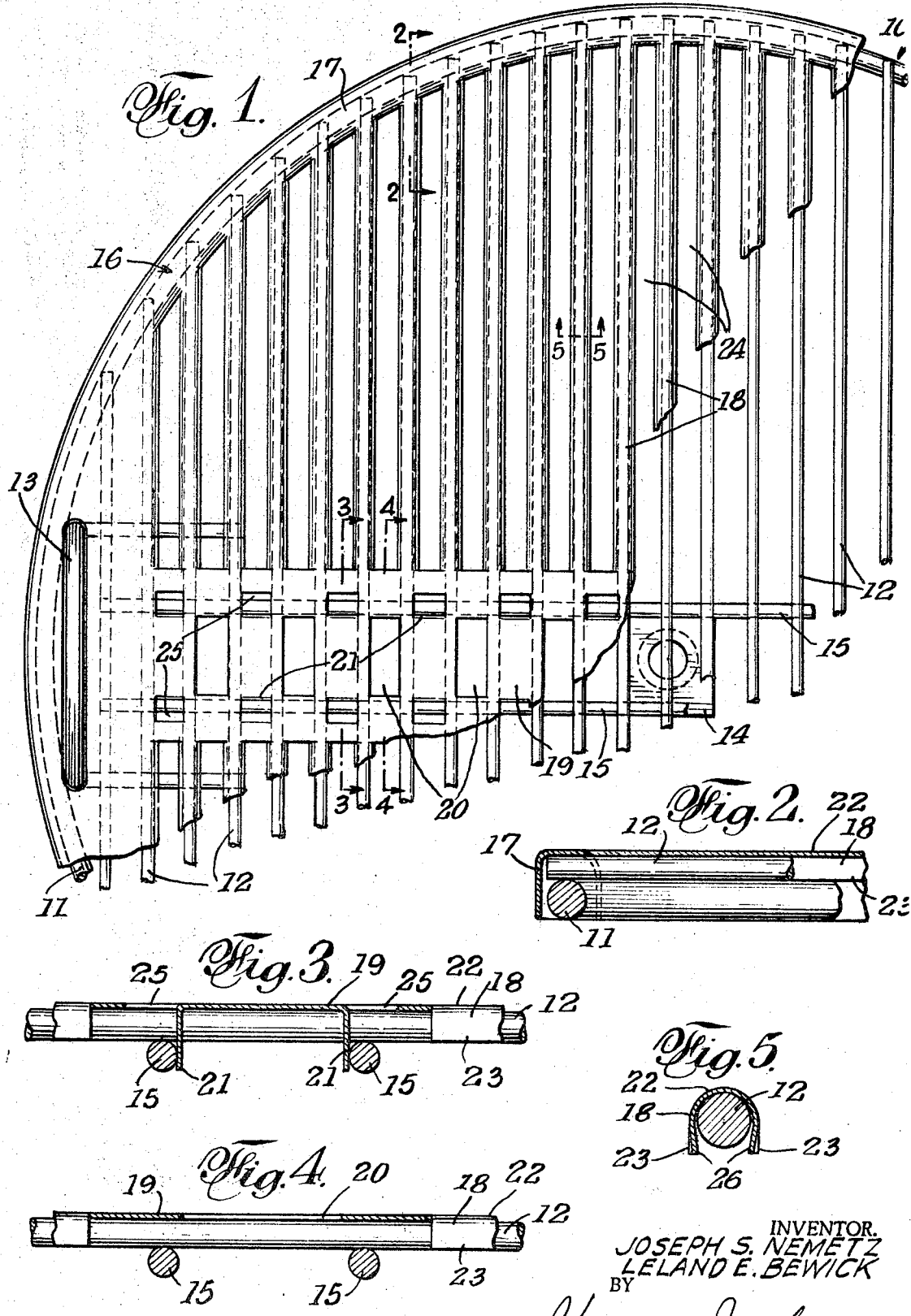

3,555,994

DISPOSABLE GRILL COVER

BACKGROUND OF THE INVENTION

The present cover is particularly applicable to barbecue grills to protect the same from being covered with grease drippings, thereby obviating the onerous chore of frequent cleaning of the food-supporting wires of the grill to rid them of fat drippings (frequently congealed). The food-broiling process is, thereby, rendered more tasty and free of undesired odors.

Liners for oven racks are known, for instance, U.S. Pat. No. 3,211,082. The same, however, rather than providing for transmission of direct heat from below as provided by a charcoal fire, shuts off most of the direct heat, leaving only small openings having a total circulating area substantially smaller than is provided by the wide spacing of the rack wires on which the liner is placed.

SUMMARY OF THE INVENTION

An object of the invention is to provide a thin-gauge sheet metal grill cover that, in most part, conforms to the wires that comprise the food supports of the grill and provides heat passages, from beneath, approaching the total area of such passages defined between the grill wires.

Another object of the invention is to provide a grill cover, as above characterized, that has separable clip-on engagement with the grill.

A further object of the invention is to provide a grill cover, as above characterized, in which the metal thereof is aluminum and the same is bendable by finger pressure to have nondisplaceable, although readily separable, connection with the grill wires.

An important feature of the invention is the disposability thereof.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

In the drawing, like reference characters designate similar parts in the several views.

BRIEF DESCRIPTION OF THE DRAWING

FIG. 1 is a broke top plan view of a disposable grill cover in operative position on a grill.

FIG. 2, 3 and 4 are enlarged cross-sectional views as taken on the respective lines 2—2, 3—3 and 4—4 of FIG. 1.

FIG. 5 is a further enlarged cross-sectional view as taken on the line 5—5 of FIG. 1.

DESCRIPTION OF THE PREFERRED EMBODIMENT

The grill 10 is generally conventional of barbecue grills that comprise a heavy wire rim 11, a plurality of usually parallel smaller wires 12 spanning across the space enclosed by said rim and joined thereto, two handles 13, one at each side of the grill, whereby the same may be handled, and a central sockteted support 14 for removable connection with a stud for rotationally supporting the grill above a bed of glowing pieces of charcoal, bricques, or like heat-providing fuel. In this case, the rim 11 is shown as circular, but the shape thereof may vary. Also, while the same is optional, it is common practice to provide such wire grills with reinforcing wires 15 arranged transversely of the wires 12 and serving to eliminate or at least minimize flexure of said wires 12, thereby keeping the grill in flat condition uniformly spaced above the fire bed.

The grill cover 16 is shown as a single stamped or otherwise formed sheet of thin-gauge aluminum that is formed with a channellike rim 17 for covering the grill rim 11, a plurality of parallel and similarly spaced cover portions 18 for the grill wires 12, a flat central portion 19 that extends transversely to the cover portions 18, heat-passing openings 20 in said central portion, and tabs 21 sheared from said central portion and bent downwardly from the plane of the cover for frictional engagement with the transverse wires 15, as best seen in FIG. 3.

The wire-covering portions 18 are preferably rounded at 22 where they rest upon the wires 12, and preferably loosely fit over said wires so flat application to the grill may be effected. The generally parallel side or skirt extensions 23 of the rounded tops 22 preferably extend below the wires to make certain that drippings may run off the cover portions 18 and not foul the wires 12. The inner circumferential flange of the cover rim 17, as shown in FIG. 2, is formed as circumferentially spaced sections so the end portions of the wires 12 may extend between said sections into said cover rim 17 for joining to the wire rim 11 of the grill 10. It will be noted that the top of the channel rim 17 and of the area of the channel portions 18 are coplanar.

The spaces 24 between the cover portions 18, while narrower than the spaces between the wires 12, are nevertheless wide enough to insure a satisfactory application of heat to the items of food resting thereupon. The line contact of such items with the rounded tops 22 of the cover portions 18 aids upward heat flow as well as drainage of fats away from contact with the grill wires. The openings 25 that result from the shearing of the tabs 21 combine with the openings 20 to provide heated air flow of such degree that, regardless of the disposition of said items for cooking or broiling, the same will be subjected to heat substantially uniformly over the entire surface of the cover.

While for purposes of strength, adjacent the handles, the cover may be imperfocate, the same does not, to any material degree, have an effect on the cooking process.

The cover-locating tabs 21 may be combined with inwardly pinched portions 26 of the skirts 23, or the latter may be used along for holding the cover nonshiftably in place.

The foillike surface of the sheet aluminum cover may readily be wiped clean after use, the cover, therefore, being capable of being used several times before requiring replacement.

It will be clear that only a few small parts of the wires 12 and 15 are likely to be in the path of fat dripping. Such small areas are readily cleaned, should their cleaning be desired.

Since some covers may be of limited rigidity and sufficiently flexible to be capable of returning to the position from which moved, the usually round grill wires 12 may be engaged by inwardly formed, longitudinally spaced portions 26 that form constrictions and are similar to those formed by finger-pinching, as shown in FIG. 5. Thus, the cover may be snapped into place on the grill with the parts 26 constricted around the round wires 12.

While the foregoing has illustrated and described what is now contemplated to be the best modes of carrying out the invention, the construction is, of course, subject to modification without departing from the spirit and scope of the invention.

We claim:

1. A disposable cover for a barbecue or broiling grill formed of transversely spaced usually round wires extending across a space enclosed by a wire rim and joined to said rim, said cover comprising:
    a. a sheet of thin-gauge sheet material provided with a channellike rim portion having parallel sides adapted to cover the grill rim and channel portions adapted to loosely cover the wires that extend across the space within the grill rim,
    b. the channellike rim portion being comprised of an outer circumferential skirt and an inner circumferential skirt that is formed of short sections that extend between adjacent transversely spaced wires, whereby the ends of the transversely spaced grill wire, where the same join the grill rim, are adapted to pass through the spaces between said short skirt sections, c. the top of the channellike rim portion and of the wire-covering channel portions being coplanar, and d. at least some of said channel portions having their sides, in part, inwardly formed to provide constrictions smaller than the diametral size of the grill wires.

2. A disposable grill cover according to claim 1 in which the sheet material is of finger-bendable thickness and is provided with a grill-covering central transverse portion, the channel portions that loosely cover the grill wires extending from the opposite edges of said central sheet portion to the channellike rim portion, tabs sheared from the sheet and bent downwardly therefrom being adapted for position-retaining frictional engagement with wires of the grill, and the sheared tabs being provided in said central sheet portion.

3. A grill cover according to claim 2 in which the grill has transverse centrally disposed wires intersecting the transversely spaced wires, the mentioned tabs having position-retaining friction engagement with said centrally disposed wires.

4. A grill cover as defined in claim 2, in which elongated air-passing spaces are provided between the channel cover portions for the entire respective lengths of said channel portions, and a plurality of air-passing openings are formed in the central transverse portion of the sheet, said spaces and openings combining to provide for barbecuing or broiling heat from below the grill reaching items of food disposed both on the wire cover portions and the central transverse portion of the sheet to efficiently barbecue or broil said items substantially uniformly.

5. A grill cover as defined in claim 4, in which each wire-covering channel portion has a transversely rounded wire-engaging and drippings-shedding form.

6. A disposable cover for a barbecue or broiling grill formed of transversly-spaced round wires extending across a space enclosed by a wire circular rim and joined to said rim, said cover comprising:

A. a channellike circular rim portion of thin gauge sheet material, said rim portion having depending parallel sides and a rounded top portion to conform to said round wire rim;

B. a plurality of parallel channellike cover portions having rounded top portions for resting upon said wires and parallel depending side extensions extending below said wires, said rim portions being intersected by one end of said channellike cover portions;

C. a flat central portion extending transversely to the channellike cover portions, said flat central portion being intersected by one end of said channellike portions, and having elongated air-passing spaces positioned along the length of said central portion;

D. a multiplicity of constrictions smaller than the diametral size of the grill wires, inwardly formed on at least some of said depending sides of said channel portions; and E. tabs sheared from said central portion and bent downwardly therefrom in position for retaining frictional engagement with the centrally disposed wires of said grill.